United States Patent
Herz et al.

(10) Patent No.: US 7,076,955 B2
(45) Date of Patent: Jul. 18, 2006

(54) METHOD FOR OPERATING AN INTERNAL COMBUSTION ENGINE HAVING AT LEAST TWO EXHAUST-GAS TURBOCHARGERS

(75) Inventors: Klaus Herz, Flein (DE); Helge Frauenkron, Markgroeningen (DE); Robert Kuenne, Freinsheim (DE); Edgar Holl, Nürtingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/045,174

(22) Filed: Jan. 27, 2005

(65) Prior Publication Data

US 2005/0188696 A1    Sep. 1, 2005

(30) Foreign Application Priority Data

Jan. 29, 2004    (DE) .................. 10 2004 004 490

(51) Int. Cl.
*F02B 27/00*    (2006.01)
*F02B 33/44*    (2006.01)
*F02B 37/007*    (2006.01)
*F02B 37/00*    (2006.01)

(52) U.S. Cl. ........................ 60/612; 123/562
(58) Field of Classification Search ................ 60/612; 123/562
See application file for complete search history.

(56) References Cited

U.S. PATENT DOCUMENTS

| | | | |
|---|---|---|---|
| 4,457,134 A * | 7/1984 | Deutschmann ............... 60/612 |
| 5,036,663 A * | 8/1991 | Akagi et al. .................. 60/612 |
| 5,090,204 A * | 2/1992 | Bonitz et al. ................. 60/612 |
| 5,289,684 A | 3/1994 | Yoshioka et al. ............. 60/612 |
| 5,845,495 A * | 12/1998 | Schray et al. ................. 60/612 |
| 6,202,414 B1* | 3/2001 | Schmidt et al. ............... 60/612 |
| 6,202,415 B1* | 3/2001 | Lohmann et al. ............. 60/612 |
| 6,206,414 B1 | 3/2001 | Cook et al. .................. 280/734 |
| 6,253,551 B1* | 7/2001 | Lohmann et al. ............. 60/602 |
| 6,263,673 B1* | 7/2001 | Schmidt et al. ............... 60/612 |
| 6,357,234 B1 | 3/2002 | Gladden ....................... 60/612 |
| 6,484,499 B1* | 11/2002 | Coleman et al. ............. 60/612 |
| 6,484,500 B1* | 11/2002 | Coleman et al. ............. 60/612 |
| 6,782,877 B1* | 8/2004 | Nau et al. ..................... 60/612 |
| 6,917,873 B1* | 7/2005 | Itoyama ....................... 60/612 |

FOREIGN PATENT DOCUMENTS

| | | | |
|---|---|---|---|
| DE | 19615033 | 10/1997 | .................. 60/612 |
| DE | 19810174 | 4/1999 | |
| JP | 59150925 A * | 8/1984 | |

* cited by examiner

*Primary Examiner*—Sheldon J Richter
(74) *Attorney, Agent, or Firm*—Kenyon & Kenyon LLP

(57) ABSTRACT

A method for operating an internal combustion engine having at least two exhaust-gas turbochargers, which allows the synchronous operation of the two exhaust-gas turbochargers to be reliably set (adjusted). For each of the at least two exhaust-gas turbochargers, an actuator for controlling the boost pressure produced by the compressors of the at least two exhaust-gas turbochargers is controlled by a separate control signal. At least one of the control signals is corrected in an open-loop-controlled manner for the purpose of synchronizing the at least two exhaust-gas turbochargers.

10 Claims, 2 Drawing Sheets

METHOD FOR OPERATING AN INTERNAL COMBUSTION ENGINE HAVING AT LEAST TWO EXHAUST-GAS TURBOCHARGERS

BACKGROUND INFORMATION

A device for regulating the boost pressure of an internal combustion engine having two exhaust-gas turbochargers is known from German Patent No. DE 19810174. In this context, the mass flow rate of air drawn in is measured by an air-mass flow sensor in each induction pipe in which a compressor of a turbocharger is situated. In addition, means are provided that calculate a controlled variable from the air-mass flow rates measured in the two induction pipes, a controller deriving a correcting variable for the turbines of the two turbochargers from the controlled variable. A comparator compares the two measured air-mass flow rates to each other, in order to monitor the synchronous operation of the two turbochargers. If, for example, one of the turbochargers generates a higher boost pressure than the other turbocharger, then the comparator generates a correcting variable for the bypass valve of the former turbocharger, which will allow the bypass flow rate of the turbine of the former. turbocharger to be increased. On the contrary, if the latter turbocharger generates a higher boost pressure than the former turbocharger, then the comparator generates a correcting variable for the bypass valve of the latter turbocharger, which will allow the bypass flow rate of the turbine of the latter turbocharger to be increased. In this manner, the use of two air-mass flow sensors in separate induction pipes of the two turbochargers allows simple synchronous regulation to be implemented.

German Patent Application No. DE 19615033 describes a set-up for detecting variations in the speed of two exhaust-gas turbochargers. In this context, the difference between the pressures prevailing in the two exhaust tracts of the two cylinder banks, upstream from the exhaust-gas turbines, is ascertained, and a relevant speed difference is signaled when the ascertained pressure difference exceeds a specifiable threshold value.

Furthermore, exhaust-gas turbochargers having a variable turbine geometry are well-known. In this context, an actuator for controlling the boost pressure generated by a compressor of the exhaust-gas turbocharger is triggered. This actuator is not, as described above, a bypass valve in a bypass which circumvents the turbine of the exhaust-gas turbocharger or the compressor of the exhaust-gas turbocharger, but rather an actuator for varying the geometry of the turbine of the turbocharger.

Exhaust-gas turbochargers having such a variable turbine geometry are currently widely used to significantly increase the power of the internal combustion engine. Compared to conventional exhaust-gas turbochargers having a bypass valve, the variable turbine geometry particularly allows for an improvement in the response in the event of a positive load change, i.e. a load change in the direction of a higher load as occurs, for example, in a starting process. In this context, the boost pressure is regulated by adjusting the guide vanes in the turbine of the turbocharger, using a separate actuator. The consequently changed speed of the shaft connecting the turbine and the compressor of the exhaust-gas turbocharger produces a higher or lower boost pressure on the side of the compressor.

SUMMARY OF THE INVENTION

The method of the present invention for operating an internal combustion engine having at least two exhaust-gas turbochargers has the advantage over the related art that at least one of the control signals is corrected in an open-loop-controlled manner for the purpose of synchronizing the operation of the at least two exhaust-gas turbochargers. In this manner, differences in the synchronous operation of the at least two turbochargers are prevented to the greatest possible extent, so that a synchronous control unit (synchronous regulation) for offsetting such differences in synchronous operation is not necessary.

It is particularly advantageous, when the at least two turbochargers are synchronized by setting equal the speeds of the turbines or compressors or drive shafts of the at least two turbochargers, or by setting equal the mass flow rates of air directed through the compressors. In this manner, when the speeds are set equal, damage to the turbochargers due to differences in the speed of the at least two turbochargers is prevented.

A further advantage is yielded when at least one of the control signals is corrected as a function of an operating point of the internal combustion engine. This allows differences in the synchronous operation of the at least two exhaust-gas turbochargers to be prevented for (at) different operating points of the internal combustion engine and, therefore, over a larger operating range of the internal combustion engine.

In addition, it is advantageous when the at least one of the control signals is corrected as a function of dimensional differences of the at least two exhaust-gas turbochargers. This allows the prevention of differences in the synchronous operation of the at least two exhaust-gas turbochargers caused by construction, i.e. differences in synchronous operation that are caused by the different construction of the at least two exhaust-gas turbochargers. Even when identical turbochargers are used, differences in synchronous operation may be caused by manufacturing tolerances, the differences in synchronous operation being able to be prevented by considering the differences of the at least two exhaust-gas turbochargers caused by the manufacturing tolerances.

A further advantage is realized when at least one of the control signals is corrected as a function of differences in the mechanical connection between the specific actuator and the corresponding exhaust-gas turbocharger. This allows the prevention of differences in synchronous operation, which are caused by differences in the mechanical connection between the specific actuator and the corresponding exhaust-gas turbocharger, the latter differences be caused in turn by, e.g. manufacturing tolerances.

A further advantage is yielded, when the at least one of the control signals is corrected as a function of space-specific, hydraulic, thermal, or other asymmetric effects in the induction-air guide or in the exhaust-gas tract of the at least two turbochargers. This allows differences in synchronous operation, which are caused by differences in the space of the specific turbocharger, in the flow (flow rate), in the temperature, or differences caused by other-asymmetric effects in the induction-air guide or in the exhaust-gas tract, to be prevented.

A further advantage is yielded when the at least one of the control signals is corrected with the aid of a characteristic curve or a characteristics map. In this manner, the closed-loop-controlled correction of the at least one of the control signals may be implemented in a particularly simple manner.

It is equally simple to implement the closed-loop-controlled correction of the at least one of the control signals, when the at least one of the control signals is corrected by multiplying it by a correction factor.

It is similarly simple to implement the open-loop-controlled correction of the at least one of the control signals, when the at least one of the control signals is corrected by adding it to a correction factor.

A further advantage is realized, when the at least one of the control signals takes the form of a pulse-width-modulated signal, and when the at least one of the control signals is corrected by varying its pulse-duty factor. In this manner, the open-loop-controlled correction of the at least one of the control signals may be implemented in a particularly simple manner, as well.

DETAILED DESCRIPTION

Figure 1:
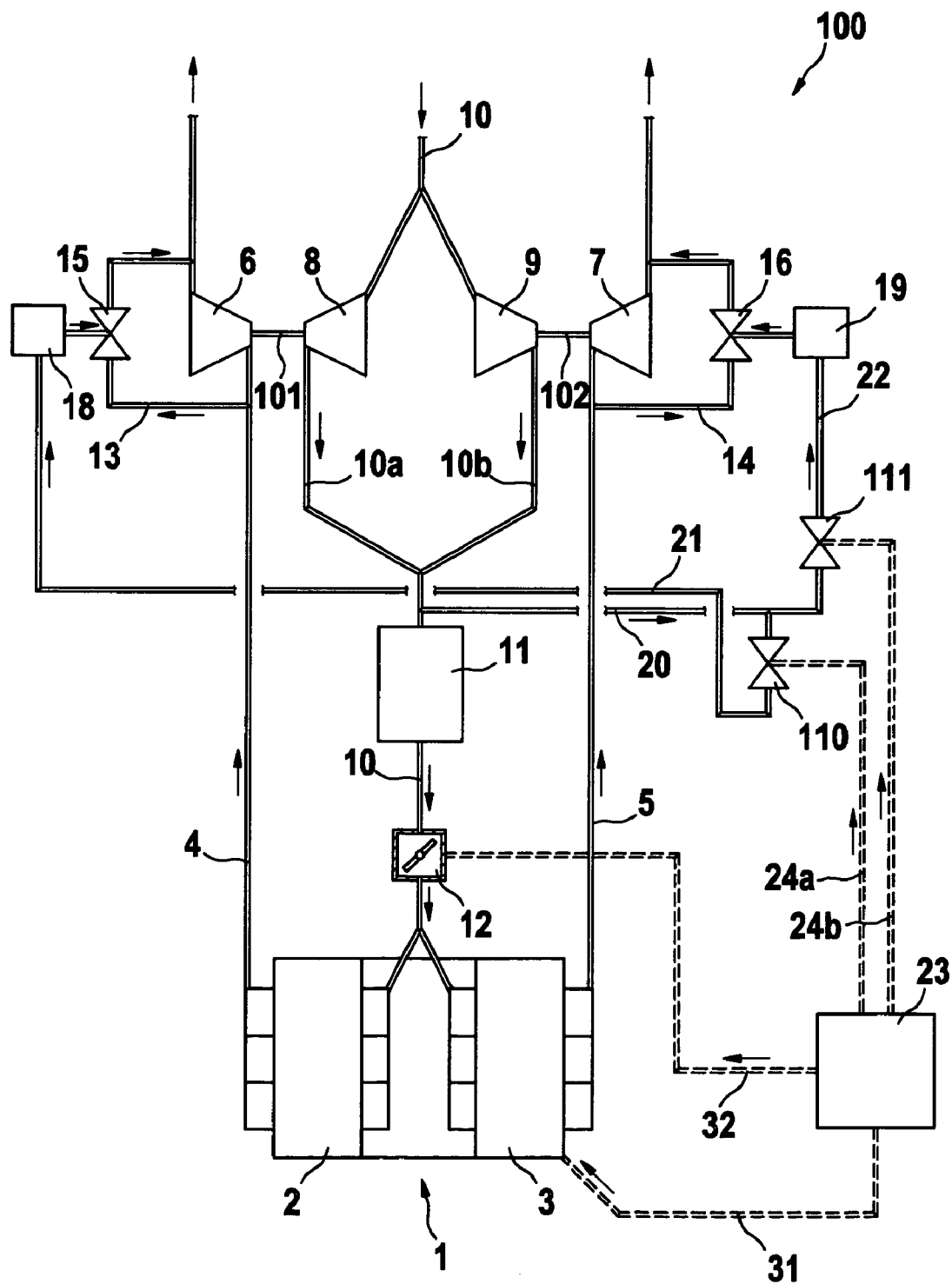
FIG. 1 shows a block diagram of an internal combustion engine having two exhaust-gas turbochargers.

Schematically represented in FIG. 1 is an internal combustion engine 100, which propels, for example, a vehicle. Internal combustion engine 100 includes a combustion engine 1, which may take the form of, e.g. a spark ignition engine or a diesel engine. In this example, combustion engine 1 includes two cylinder banks 2, 3. Each cylinder bank 2, 3 has its own exhaust-gas branch or exhaust-gas tract 4, 5. An exhaust-gas turbine 6, 7 of an exhaust-gas turbocharger is installed in each exhaust-gas tract 4, 5. Exhaust-gas turbine 6 in exhaust tract 4 drives a compressor 8, and exhaust-gas turbine 7 in exhaust tract 5 drives a compressor 9. The two compressors 8, 9 compress the induction air in an induction-air guide or in an induction tract, which, in the represented exemplary embodiment, includes a common induction pipe 10 and two induction lines 10a, 10b in which an intercooler 11 and a throttle valve 12 are positioned. The degree of opening of throttle valve 12 is controlled by an engine control unit or a control unit 23 via line 32, in a manner known to one skilled in the art, e.g. in order to carry out a command input by the driver at an accelerator pedal not shown in FIG. 1. Downstream from throttle valve 12, induction pipe 10 branches out to the two cylinder banks 2, 3. Common induction pipe 10 branches out to the inlets of the two parallelly connected compressors 8, 9, into a first induction line 10a through compressor 8, and into a second induction line 10b through compressor 9, and the outlets of the two compressors 8, 9 are brought together upstream from intercooler 11. Instead of the two cylinder banks 2, 3 being provided a common induction tract, each cylinder bank 2, 3 may also have a separate induction tract in which corresponding compressors 8, 9 compress the induction air. Compressors 8, 9 are driven by exhaust-gas turbines 6, 7, respectively, via drive shafts 101, 102, respectively.

Exhaust-gas turbines 6, 7 are provided with bypass lines 13, 14, respectively. Using a valve 15, 16 present in bypass line 13, 14, the bypass flow rate and, therefore, the speed of exhaust-gas turbine 6, 7 and, as a result, the boost pressure generated by compressor 8, 9 in induction tract 10 is adjustable. To control the boost pressure in a closed-loop and open-loop manner, the two exhaust-gas turbochargers are each provided with an actuator, which, in the exemplary embodiment shown in FIG. 1, is made up of a pulse valve 110, 111 and a pressure box 18, 19 in a known manner, the pressure box adjusting the opening of bypass valve 15, 16 via a linkage. Pulse valve 110 and pulse valve 111 are directly acted upon by the boost pressure generated by the two compressors 8, 9, via a line 20 connected to induction tract 10. Pulse valves 110, 111 receive a pulse-width-modulated, control-pulse signal from control unit 23, via lines 24a, 24b, respectively. The pulse-width-modulated, control-pulse signals each represent a control signal of the corresponding actuator.

In the described example, a first of the two exhaust-gas turbochargers includes a first exhaust-gas turbine or turbine 6, a first compressor 8, and a first drive shaft 101. First turbine 6 drives first compressor 8 via first drive shaft 101. A first bypass line 13 having a first bypass valve 15 circumvents first turbine 6. A first actuator includes a first pulse valve 110 and a first pressure box 18, which is triggered by first pulse valve 110 via a first pressure line 21 and adjusts the degree of opening of first bypass valve 15 in accordance with a first control signal, which is transmitted by engine control unit 23 to first pulse valve 110 via a first control line 24a. In the described example, the second of the two exhaust-gas turbochargers includes a second exhaust-gas turbine or turbine 7, a second compressor 9, and a second drive shaft 102. Second turbine 7 drives second compressor 9 via second drive shaft 102. A second bypass line 14 having a second bypass valve 16 circumvents second turbine 7. A second actuator includes a second pulse valve 111 and a second pressure box 19, which is triggered by second pulse valve 111 via a second pressure line 22 and adjusts the degree of opening of second bypass valve 16 in accordance with a second control signal, which is transmitted by engine control unit 23 to second pulse valve 111 via a second control line 24b.

Using one or more control lines 31, engine control unit 23 controls combustion parameters, such as the fuel feed and, in the case of a spark ignition engine, the ignition firing point, in a manner known to one skilled in the art.

The described design of internal combustion engine 100 is essentially already known from German Patent Application No. DE 19615033.

According to an alternative embodiment, one of the two exhaust-gas turbochargers or both turbochargers may take the form of an exhaust-gas turbocharger having a variable turbine geometry. In this case, with regard to the exhaust-gas turbocharger having a variable turbine geometry, the boost pressure in induction tract 10 is not controlled via a bypass valve, but rather by changing the turbine geometry of the exhaust-gas turbocharger. For this purpose, the guide vanes of the corresponding turbine are adjusted. At present, guide vanes are almost predominantly adjusted by pressure-based adjustment systems, e.g. using hydraulic intensifiers. Therefore the design known from FIG. 1, having the above-described actuators made up of a pulse valve and hydraulic intensifier may also be applied to the case of turbochargers having a variable turbine geometry, whereby in this case, the corresponding hydraulic intensifier adjusts the guide vanes of the corresponding turbine, e.g. using a linkage again.

Recently, electrical adjustment systems have also been used on occasion in connection with the adjustment of the turbine guide vanes of a turbocharger having a variable turbine geometry. In this case, the pressure-based control of the actuators shown in FIG. 1 is not necessary. Therefore, line 20 connected to induction tract 10, and pulse valves 110, 111, may be omitted. In this case, electrically controlled actuators, which each convert a control signal of engine control unit 23 to a mechanical adjustment (movement) of the variable turbine geometry or to a mechanical variation of the degree of opening of the corresponding bypass valve, may be used as actuators for changing the variable turbine geometry or changing the degree of opening of bypass valves 15, 16. Such actuators may be constructed, for example, on the basis of the piezoelectric principle, in a manner known to one skilled in the art. In this case, depending on if the corresponding exhaust-gas turbocharger is designed to have a bypass valve or a variable turbine geometry, engine control unit 23 would control, via a first-line or control line 24a, a first actuator for controlling the bypass valve or the variable turbine geometry of first exhaust-gas turbocharger 6, 8, 101 with the aid of a first control signal; and the engine control unit would control, via a second line or control line 24b, a second actuator for controlling the bypass valve or the variable turbine geometry of second exhaust-gas turbocharger 7, 9, 102 with the aid of a second control signal.

As an alternative, a turbocharger having a variable turbine geometry or a bypass valve may therefore be controlled with the aid of such an electrical adjustment system, as well. In comparison with pressure-based systems, such electrical adjustment systems provide options for precise intervention, i.e. a predefined state of the position of the guide vanes is set in an exact and reproducible manner. As a rule, the actuator of such an electrical adjustment system is also controlled via a pulse-width-modulated signal, by appropriately adjusting its pulse-duty factor. In this example, the two described control signals therefore take the form of pulse-width-modulated signals having an appropriate pulse-duty factor.

As described, electrical adjustment systems are starting to be used to control exhaust-gas turbochargers, in particular those having a variable turbine geometry. In this context, their potential, i.e. actuator accuracy and speed, is not yet fully exhausted. If it is necessary, e.g. due to reasons of space, for the mechanical power transmission between the electrical adjustment system, i.e. the specific actuator, and the corresponding exhaust-gas turbocharger to be designed differently in the case of internal combustion engines having several cylinder banks, such as in FIG. 1, this normally results in a different blade setting of the specific turbine in the case of using exhaust-gas turbochargers having a variable turbine geometry, or in a different degree of opening of the specific bypass valve in the case of using exhaust-gas turbochargers having a bypass valve. This, in turn, results in the speed of the different compressors and, therefore, the generated boost pressure of the different compressors being different. Such behavior is undesirable from the point of view of the system. This may have a detrimental effect on a utilized turbo-pressure control system and on the service life of internal combustion engine 1, since, e.g. the different speeds of the compressors may cause the temperature of the air supplied to internal combustion engine 1 via induction tract 10 to be exceeded and the compressors to rotate too fast, i.e. the potential power output of the exhaust-gas turbochargers to not be used optimally. Similar asymmetric effects due to asymmetric designs may also occur in the air guide of induction tract 10 between the specific compressors and the junction of the two induction lines 10a, 10b, as well as in the ratio of the two exhaust-gas tracts 4, 5. These may have a disadvantageous effect in the same manner.

The present invention now provides for at least one of the control signals for controlling an actuator of an exhaust-gas turbocharger being corrected in an open-loop-controlled manner for the purpose of synchronizing the two exhaust-gas turbochargers. In this context, the two exhaust-gas turbochargers may be synchronized, e.g. by setting the speed of turbines 6, 7, compressors 8, 9, or drive shafts 101, 102 of the two exhaust-gas turbochargers to be equal, or by setting the mass flow rate of air directed through the compressors to be equal.

By manipulating one of the two control signals or both control signals at the two actuators of the electrical adjustment system, e.g. by manipulating the corresponding pulse-duty factors of the control signal(s), the above-described mechanical asymmetry may be compensated for, and therefore, the two exhaust-gas turbochargers may be synchronized. This means that, from a predefined setpoint value for the pulse-duty factor of the control signals, each actuator is assigned a separate, calculated pulse-duty factor and, therefore, a separate control signal by engine control unit 23.

Figure 2:
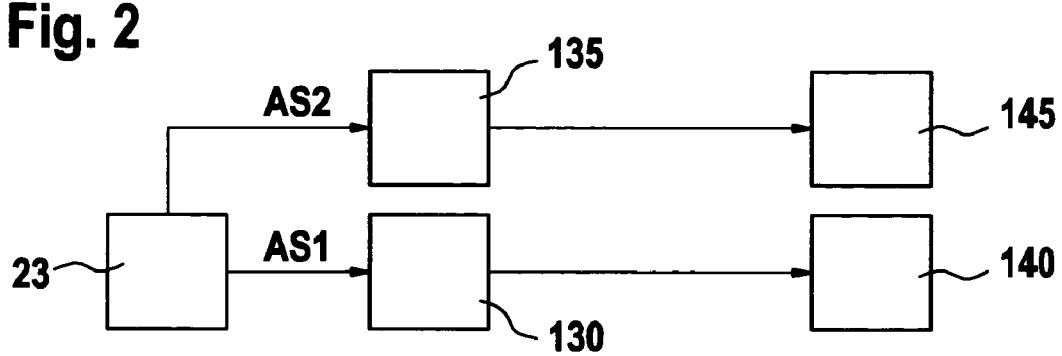
FIG. 2 shows a block diagram of the control of an exhaust-gas turbocharger.

In FIG. 2, these facts are explained once more with the aid of a block diagram. Engine control unit 23 transmits a first control signal AS1 to the first actuator, which is indicated by reference numeral 130 and controls the boost pressure in first induction line 10a of the first exhaust-gas turbocharger; for reasons of clarity, the first exhaust-gas turbocharger in FIG. 2 being denoted by reference numeral 140. Engine control unit 23 transmits a second control signal AS2 to the second actuator, which is indicated by reference numeral 135 and controls the boost pressure in second induction line 10b of the second exhaust-gas turbocharger; for reasons of clarity, the second exhaust-gas turbocharger in FIG. 2 being denoted by reference numeral 145.

As described above, it is not important to the present invention if the specific actuator takes the form of an electrical adjustment system or a pressure-based adjustment system as in FIG. 1, although in the case of a pressure-based adjustment system according to FIG. 1, the specific actuator includes both the corresponding pulse valve and the hydraulic intensifier. Furthermore, the fact that the exhaust-gas turbocharger is operated with the aid of a variable turbine geometry or a bypass valve is not important for the present invention. In addition, one exhaust-gas turbocharger may be operated using a variable turbine geometry, and the other using a bypass valve, or both may be operated using variable turbine geometry or a bypass valve. Furthermore, more than two exhaust-gas turbochargers may also be provided in the case of more than two cylinder banks, the exhaust-gas turbochargers being synchronizable in a corresponding manner.

First control signal AS1 and/or second control signal AS2 may now be corrected as a function of dimensional differences of the two exhaust-gas turbochargers 140, 145. This allows differences in the synchronous operation of the two exhaust-gas turbochargers 140, 145 caused by construction, i.e. differences in synchronous operation that are caused by the different construction of the two exhaust-gas turbochargers 140, 145, to be prevented. Even when identical turbochargers 140, 145 are used, differences in synchronous operation may be caused by manufacturing tolerances, the differences in synchronous operation being able to be prevented by considering the differences in the two exhaust-gas turbochargers 140, 145 caused by manufacturing tolerances. To ascertain the manufacturing tolerances of the two exhaust-gas turbochargers 140, 145, the individual components of exhaust-gas turbochargers 140, 145, such as turbines 6, 7, compressors 8, 9, and drive shafts 101, 102 may be measured exactly. The differences resulting from measuring the components of the two exhaust-gas turbochargers 140, 145, which are referred to here as dimensional differences of the two turbochargers 140, 145 and may result in different speeds of the two exhaust-gas turbochargers 140, 145 when actuators 130, 135 are controlled in the same manner, may then be compensated for by appropriately correcting first control signal AS1 and/or second control signal AS2. In this context, the necessary corrections may be applied, for example, on a bench dynamometer or during highway tests.

In addition, or as an alternative, it may be provided that first control signal AS1 and/or second control signal AS2 be corrected as a function of differences in the mechanical connection between specific actuator 130, 135 and corresponding exhaust-gas turbocharger 140, 145. This allows the prevention of differences in synchronous operation, which are caused by differences in the mechanical connection between the specific actuator and the corresponding exhaust-gas turbocharger, the latter differences being caused again by, e.g. manufacturing tolerances. If it is necessary, e.g. due to reasons of space, for the mechanical power transmission between the electrical adjustment system, i.e. specific actuator 130, 135, and corresponding exhaust-gas turbocharger 140, 145 to be designed differently in the case of internal combustion engines having several cylinder banks, such as in FIG. 1, this normally results in a different blade setting of the specific turbine 6, 7 in the case of using exhaust-gas turbochargers having a variable turbine geometry, or in a different degree of opening of specific bypass valve 15, 16 in the case of using exhaust-gas turbochargers having a bypass valve. This, in turn, results in the speed of different compressors 8, 9 and, therefore, the generated boost pressure of different compressors 8, 9 being different.

To ascertain the different mechanical power transmission between actuators 130, 135 and the two exhaust-gas turbochargers 140, 145, the mechanical connections between actuators 130, 135 and corresponding exhaust-gas turbochargers 140, 145 may be measured exactly. In the case of exhaust-gas turbochargers having a variable turbine geometry, the mechanical connection between the specific actuator and the turbine of the corresponding exhaust-gas turbocharger is measured, and in the case of exhaust-gas turbochargers having a bypass valve, the mechanical connection between the specific actuator and the bypass valve of the corresponding exhaust-gas turbocharger is measured. This may be implemented for both the pressure-based and electrical adjustment systems. The differences resulting from measuring the mechanical connection between the two actuators 130, 135, and respectively assigned exhaust-gas turbochargers 140, 145, which cause exhaust-gas turbochargers 140, 145 to run at different speeds when actuators 130, 135 are controlled in the same manner, may then be compensated for, in turn, by appropriately correcting first control signal AS1 and/or second control signal AS2. In this context, the necessary corrections may be applied, for example, on a bench dynamometer or during highway tests.

In addition, or as an alternative, it may be provided that first control signal AS1 and/or second control signal AS2 be corrected as a function of space-specific, hydraulic, thermal, or other asymmetric effects in the induction air guide or in induction tract 10, 10a, 10b or in exhaust branches 4, 5 of the two exhaust-gas turbochargers 140, 145. This allows differences in synchronous operation, which are caused by differences in the space of specific turbocharger 140, 145, in the flow rate, or in the temperature, or differences caused by other asymmetric effects in induction-air guide 10, 10a, 10b or in exhaust branches 4, 5, to be prevented. The induction tract is formed, as described, by common induction pipe 10 and the two induction lines 10a, 10b. Examples of space-specific differences in the two exhaust-gas turbochargers 140, 145 have already been described above. Hydraulic differences may result, for example, from different cross-sectional areas in the two induction lines 10a, 10b or different cross-sectional areas of the two exhaust-gas tracts 4, 5. Thermal differences may occur, for example, on the basis of the positioning of the two exhaust-gas turbochargers 140, 145 in internal combustion engine 100.

Depending on the arrangement of the two exhaust-gas turbochargers 140, 145, the air-mass flows compressed by compressors 8, 9 or the exhaust-mass flows driving turbines 6, 7 may have different temperatures and effect, in this manner, different behaviors of the two exhaust-gas turbochargers 140, 145 with respect to their speeds. Thus, the described thermal characteristic of the two exhaust gas turbochargers 140, 145 in the case of a transversally installed engine 1 having the two cylinder banks 2, 3 may differ from the described temperature characteristic of the two exhaust gas turbochargers 140, 145 in the case of an in-line engine having two exhaust gas turbochargers 140, 145 positioned side-by-side. In addition, other asymmetric effects based on, for example, other different geometries of the two induction lines 10a, 10b or the two exhaust-gas tracts 4, 5, which, as the remaining, above-mentioned effects, may lead to different speeds of the two exhaust-gas turbochargers 140, 145, may be considered in the correction of first control signal AS1 and/or second control signal AS2. The described hydraulic differences may be ascertained, for example, by measuring the cross-sections of the two induction lines 10a, 10b or the sections of the two exhaust-gas tracts 4, 5. The described thermal differences may be ascertained, e.g. with the aid of temperature sensors. Because of the ascertained differences, the two exhaust-gas turbochargers 140, 145 normally have different speeds, when actuators 130, 135 are controlled in the same manner. These differences may then, in turn, be compensated for by appropriately correcting first control signal AS1 and/or second control signal AS2. In this context, the necessary corrections may be applied, for example, on a bench dynamometer or during highway tests.

The described differences may have a variable effect on the speed characteristic of the two exhaust-gas turbochargers 140, 145 as a function of the current operating point of internal combustion engine 100. The current operating point of internal combustion engine 100 may be ascertained, for example, from current engine speed n and current engine load tl. In this context, current engine speed n is measured by a speed sensor in the region of internal combustion engine 1, in a manner known to one skilled in the art, and transmitted to engine control unit 23, the speed sensor not being shown in FIG. 1. Engine load tl may be derived in a manner known to one skilled in the art, from, for example, the fuel-injection time per injection occurrence known in engine control unit 23. Therefore, first control signal AS1 and/or second control signal AS2 may also be corrected as a function of the current operating point of internal combustion engine 100.

When applying the necessary corrections, correction values for a control signal initially common to all of the exhaust-gas turbochargers, for forming different control signals for the individual turbochargers, may be determined as a function of the current operating point of internal combustion engine 100, in order to synchronize the speeds of the exhaust-gas turbochargers at the current operating point of internal combustion engine 100. Therefore, such a correction value is ascertained for each of the exhaust-gas turbochargers for the current operating point and stored in engine control unit 23 in association with the current operating point of internal combustion engine 100. This operation may be repeated for a plurality of operating points of internal combustion engine 100. In the application case, i.e. during operation of internal combustion engine 100, the correction value assigned to this current operating point in engine control unit 23 is fetched out as a function of the instantaneously current operating point for each of the exhaust-gas turbochargers and linked to the control signal, which is initially common to all exhaust-gas turbochargers and may likewise be stored in engine control unit 23, in order to obtain the individual control signal corrected for the specific exhaust-gas turbocharger. If no correction value for generating the individual control signals for the exhaust-gas turbochargers is stored in engine control unit 23 for a current operating point of internal combustion engine 100, then the correction values necessary for this current operating point of internal combustion engine 100 may also be derived by interpolating correction values of adjacent operating points, for which correction values are stored in engine control unit 23.

Figure 3:
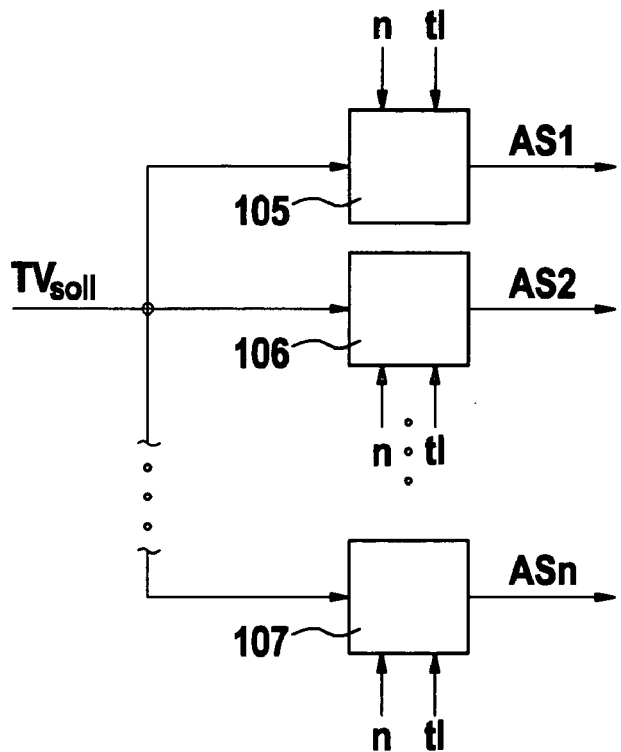
FIG. 3 shows a flowchart for correcting at least one of the control signals of one of the turbochargers.

A flow chart, which is meant to describe the correction of the control signals for the general case of an internal combustion engine having n exhaust-gas turbochargers, is now represented in FIG. 3. The described flow chart may be implemented in engine control unit 23 in the form of software and/or hardware. Engine control unit 23 initially generates a setpoint value for a boost pressure to be generated at the junction of the two induction lines 10a, 10b, in a manner known to one skilled in the art, as a function of the current operating point of internal combustion engine 100, and converts this setpoint value to a setpoint value TVsetpoint for a pulse duty factor, with the aid of which the actuators of the exhaust-gas turbochargers of internal combustion engine 100 should be controlled in the same manner. According to the flow chart in FIG. 3, setpoint value TVsetpoint for the pulse duty factor is now supplied to a first correction element 105, a second correction element 106, and further correction elements up to an nth correction element 107.

In this context, n is the number of exhaust-gas turbochargers used in internal combustion engine 100. In this case, n is greater than or equal to 2. Therefore, in the case of two exhaust-gas turbochargers, as represented in FIG. 1, first correction element 105 and second correction element 106 are provided. In the following, it shall be exemplarily assumed that only first correction element 105 and second correction element 106 are provided to be used for the exemplary embodiment, which is described on the basis of FIG. 1 and has the two exhaust-gas turbochargers 140, 145 according to FIG. 2. In first correction element 105, setpoint value TVsetpoint for the pulse duty factor is corrected, in order to obtain first control signal AS1 for first actuator 130. In second correction element 106, setpoint value TVsetpoint for the pulse duty factor is corrected, in order to obtain second control signal AS2 for second actuator 135. Then, in nth correcting element 107, setpoint value TVsetpoint for the pulse duty factor is generally corrected, in order to obtain an nth control signal ASn for an nth actuator of an nth exhaust-gas turbocharger.

Correcting elements 105, 106, . . . , 107 may each take the form of, e.g. a characteristic curve, so that a different correction or no correction at all of setpoint value TVsetpoint for the pulse duty factor may be carried out for each control signal AS1, AS2, . . . ASn as a function of setpoint value TVsetpoint for the pulse duty factor, and as a function of the correcting element, in order to obtain different control signals AS1, AS2, . . . , ASn for the actuators of the utilized exhaust-gas turbochargers and, therefore, to compensate for the above-mentioned differences in the design of the utilized exhaust-gas turbochargers for synchronizing the speeds of the utilized exhaust-gas turbochargers. In this context, the individual characteristic curves may be appropriately applied, as described above, to compensate for these differences on a bench dynamometer or in highway tests. To take into consideration the effect of the current operating point of internal combustion engine 100 on the above-described differences while designing the utilized exhaust-gas turbochargers, it may be advantageously provided that the correction of setpoint value TVsetpoint for the pulse duty factor also be carried out by individual correcting elements 105, 106, . . . , 107 as a function of the current operating point of internal combustion engine 100, in order to form individual control signals AS1, AS2, . . . , ASn. In this case, individual correcting elements 105, 106, . . . , 107 are additionally supplied the current operating point of internal combustion engine 100 in the form of current engine speed n and current engine load tl, as shown in FIG. 3. In this manner, correcting elements 105, 106, . . . , 107 may each take the form of a characteristics map, which, in addition to setpoint value TVsetpoint for the pulse duty factor, is also supplied current engine speed n and current engine load tl and delivers, as an output variable, a respective control signal AS1, AS2, . . . , ASn for the corresponding actuator as a function of the input variables. In this context, the individual characteristics maps may be appropriately applied, as described above, to compensate for the above-mentioned differences on a bench dynamometer or in highway tests, as a function of the operating point.

Control signals AS1, AS2, . . . , ASn each represent a pulse duty factor that is corrected with respect to setpoint value TVsetpoint for the pulse duty factor. However, not every control signal must be corrected with respect to setpoint value TVsetpoint for the pulse duty factor.

In the described characteristic-curve or characteristics-map design approach, setpoint value TVsetpoint for the pulse duty factor is assigned, in each correcting element 105, 106, . . . , 107, a pulse duty factor, which may be corrected and takes the form of control signal AS1, AS2, . . . , ASn. As an alternative, setpoint value TVsetpoint for the pulse duty factor may be corrected in one or more of correcting elements 105, 106, . . . , 107 by multiplying it, in each instance, by a correction factor, the specific correction factor being able to be, e.g. likewise specified as a function of the operating point. In this manner, the pulse duty factor of individual control signals AS1, AS2, . . . , ASn is determined, if applicable, by multiplying setpoint value TVsetpoint for the pulse duty factor by the corresponding correction factor. As an alternative, setpoint value TVsetpoint for the pulse duty factor may be corrected in one or more of correcting elements 105, 106, . . . , 107 by adding it, in each instance, to a correction factor, the specific correction factor being able to be, e.g. likewise specified as a function of the operating point.

In this manner, the pulse duty factor of individual control signals AS1, AS2, . . . , ASn is determined, if applicable, by adding setpoint value TVsetpoint for the pulse duty factor to the corresponding correction factor. In this context, the individual correction factors or correction values may be appropriately applied, as described above, to possibly compensate for the above-mentioned differences in the layout of the exhaust-gas turbochargers as a function of the operating point, the compensation being carried out on a bench dynamometer or in highway tests.

To correct setpoint value TVsetpoint for the pulse duty factor for the purpose of determining individual control signals AS1, AS2, . . . , ASn, the above-described variants may also be combined as needed. Thus, correcting elements 105, 106, . . . , 107 may include characteristics maps, which each output a correction factor and/or a correction value as a function of the current operating point of internal combustion engine 100 and as a function of specified setpoint value TVsetpoint for the pulse duty factor; using a multiplication element or a summing element as a component of the corresponding correcting element, setpoint value TVsetpoint for the pulse duty factor subsequently being multiplied by the correction factor, or setpoint value TVsetpoint for the pulse duty factor subsequently being added to the correction factor. In this context, both the multiplicative correction and the additive correction may be carried out. However, either just the multiplicative correction or just the additive correction may also be carried out. Furthermore, it may be provided that one or more correcting elements only carry out a characteristic-based or characteristics-map-based correction of setpoint value TVsetpoint for the pulse duty factor for generating the corresponding control signal, whereas one or more different correcting elements additionally our alternatively carry out a correction of setpoint value TVsetpoint for the pulse duty factor multiplicatively and/or additively, in order to generate the corresponding control signal.

With the aid of correcting elements 105, 106, . . . , 107, a correction of setpoint value TVsetpoint for the pulse duty factor may be carried out in an open-loop-controlled manner as described, in order to generate individual control signals AS1, AS2, . . . , ASn. This is in contrast to a closed-loop-controlled correction known from the above-described related art. The open-loop-controlled correction has the advantage over the closed-loop-controlled correction, the may be implemented more rapidly and therefore results in a more effective and more rapid response of the exhaust-gas turbochargers of internal combustion engine 100. In addition, no additional sensors are required.

Figure 4:
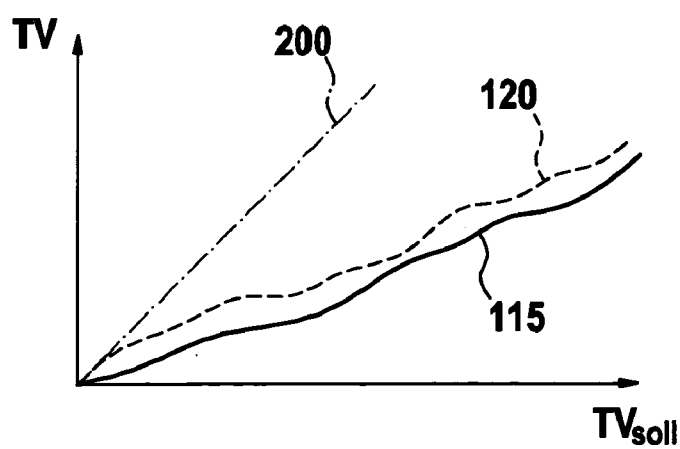
FIG. 4 shows the curve of two pulse-duty factors for controlling two exhaust-gas turbochargers as a function of a specified setpoint value for the pulse-duty factor.

Displayed in FIG. 4 is an example of a curve of two control signals 115, 120 as a function of a specified setpoint value TVsetpoint for the pulse duty factor. In this instance, the two control signals 115, 120 each represent a pulse duty factor TV that is corrected with respect to setpoint value TVsetpoint for the pulse duty factor. In this context, the two control signals 115, 120 are below uncorrected setpoint value TVsetpoint for the pulse duty factor, which is indicated by a dot-dash line and reference numeral 200 in FIG. 4. In addition, the two control signals 115, 120 are corrected differently with respect to setpoint value TVsetpoint for the pulse duty factor, as can be seen in the curve of dashed-line control signal 120, which is different from the curve of solid-line control signal 115. In this context, the two control signals 115, 120 may be, for example, above-described, first control signal AS1 and above-described, second control signal AS2 for the case of internal combustion engine 100 having two exhaust-gas turbochargers 140, 145. In this instance, the correction of setpoint value TVsetpoint for the pulse duty factor, which is illustrated by a dot-dash line in FIG. 4, may be carried out in the above-described manner for the purpose of generating the two control signals 115, 120.

In the above, the implementation of the method according to the present invention within engine control unit 23 has been described. The software and/or hardware modules, which are necessary for implementing the method of the present invention and are exemplarily represented in connection with FIG. 3, may also be alternatively implemented at least partially outside of engine control unit 23 in separate, supplementary electrical components, or in the actuators.

The method of the present invention allows for more effective utilization of the potential of, in particular, an exhaust-gas turbocharger, which has, in particular, a variable turbine geometry and is operated by an electrical adjustment system.

What is claimed is:

1. A method for operating an internal combustion engine having at least two exhaust-gas turbochargers, the method comprising:
    controlling, in each instance, one actuator for controlling a boost pressure produced by compressors of the at least two exhaust-gas turbochargers by a separate control signal; and
    correcting at least one of the control signals in an open-loop-controlled manner for synchronizing the at least two exhaust-gas turbochargers.

2. The method according to claim 1, further comprising synchronizing the at least two exhaust-gas turbochargers one of (a) by setting speeds of one of turbines, the compressors and drive shafts of the at least two exhaust-gas turbochargers to be equal and (b) by setting a mass of air directed through the compressors to be equal.

3. The method according to claim 1, wherein the at least one of the control signals is corrected as a function of an operating point of the internal combustion engine.

4. The method according to claim 1, wherein the at least one of the control signals is corrected as a function of dimensional differences of the at least two exhaust-gas turbochargers.

5. The method according to claim 1, wherein the at least one of the control signals is corrected as a function of differences in a mechanical connection between a specific actuator and a corresponding exhaust-gas turbocharger.

6. The method according to claim 1, wherein the at least one of the control signals is corrected as a function of at least one of space-specific, hydraulic, thermal, and other asymmetric effects in one of an induction air guide and an exhaust branch of the at least two exhaust-gas turbochargers.

7. The method according to claim 1, wherein the at least one of the control signals is corrected with the aid of one of a characteristic curve and a characteristics map.

8. The method according to claim 1, wherein the at least one of the control signals is corrected by multiplying it by a correction factor.

9. The method according to claim 1, wherein the at least one of the control signals is corrected by adding it to a correction factor.

10. The method according to claim 1, wherein the at least one of the control signals has the form of a pulse-width-modulated signal, and the at least one of the control signals is corrected by varying its pulse duty factor.

* * * * *